Figure 1:
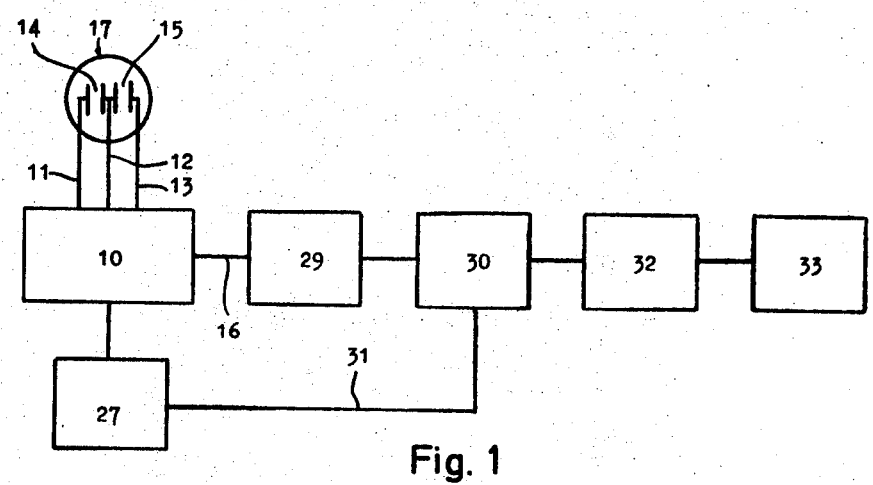

United States Patent
Stigmark et al.

[15] 3,656,456
[45] Apr. 18, 1972

[54] APPARATUS FOR INDICATING AND MEASURING ANIMAL ACTIVITY

[72] Inventors: Karl Adolf Lennart Stigmark, Bildsnidarevagen 2, 245 00, Staffanstorp; Nils Ingvar Jonsson, Silvas Grand 4, 240 20, Furulund; Jan Wilhelm Lofqvist, Winstrupsgatan 7, 222 22; Hakan Christian Mikael Stenram, Warholms vag 8 B, VIII, 223 65, both of Lund, all of Sweden

[22] Filed: Sept. 11, 1970
[21] Appl. No.: 71,316

[52] U.S. Cl. ............................................................ 119/1
[51] Int. Cl. ................. A01k 29/00, A01k 1/00, G01n 29/00
[58] Field of Search ........................................................ 119/1

[56] References Cited
UNITED STATES PATENTS 3,100,473 8/1963 Kissel ........................................ 119/1
3,304,911 2/1967 Hakata et al. ............................... 119/1
3,494,329 2/1970 Frieberger et al. ......................... 119/1
3,540,413 11/1970 Castaigne ................................... 119/1

*Primary Examiner*—Aldrich F. Medbery
*Attorney*—Christen & Sabol

[57] ABSTRACT

An apparatus for indication of moving activity of animals which are disposed in closed space in which at least one of the walls is provided with a number of small capacitor plates which form at least one capacitor in a balanced bridge. When the animals move the dielectric constant of this capacitor is affected and an unbalance voltage is obtained in the bridge. The variations of this voltage are indicated in an indicator connected to the bridge via a derivating network.

8 Claims, 5 Drawing Figures

APPARATUS FOR INDICATING AND MEASURING ANIMAL ACTIVITY

The present invention refers to an apparatus for automatic indication of the activity of organisms, especially animals, e.g., to be used in investigations of the effect of different substances, such as medicines or drugs or different environments, on the activity of animals.

Equipments for investigating the activity of animals are known per se. The apparatus generally comprises a space where the animals are kept and an indicating instrument that is affected by the movements of the animals. The apparatus could, e.g., consist of a movable plate on which the animals are kept, the movements of the animals implying the plate to activate electric contacts which give rise to electrical signals. The indication will, however, not be very exact and the apparatus could only be used when the number of animals is small. Animals could also be photographed at regular intervals and the film afterwards be studied. The evaluation of the results will, however, in this case be very time-consuming. It is also possible to design an apparatus with an optical or an acoustic indication, the optic apparatus using at least one light beam which effects a photocell, the light beam being cut off when the animals move in the space, whereas the acoustic apparatus records the noise derived from the movement of the animals. The essential drawback of the optic apparatus consists in that large areas of the space are not covered by the light beam, and furthermore, the light could disturb the animals so that the result of the investigation will not be adequate. The acoustic apparatus suffers from an important drawback in that it is very difficult to supress noise derived from outside the apparatus. Thus, the equipments known per se, have very limited applications.

In order to eliminate the above-mentioned drawbacks and to provide an apparatus which is more generally usable and which gives an adequate indication of the activity of organisms without introducing irrelevant factors in the result, it is an object of the present invention to provide an apparatus which is defined in claim 1.

Figure 2:
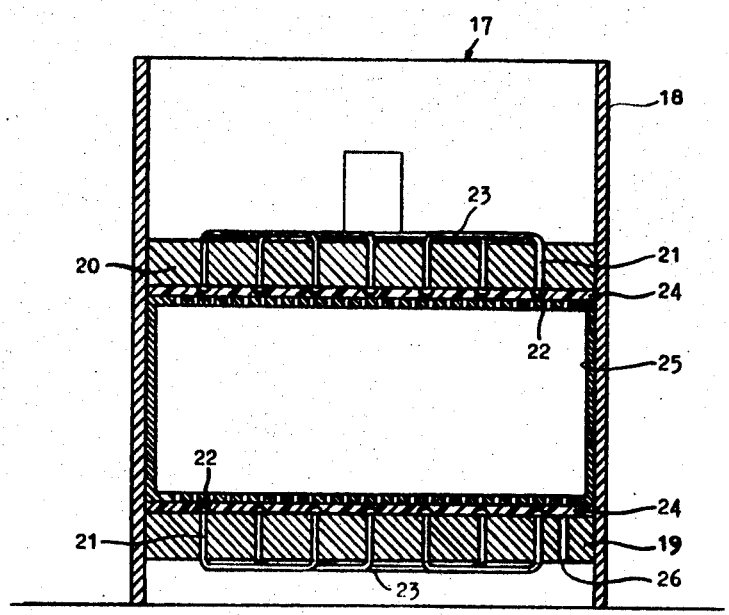

An embodiment of an apparatus according to the invention will be described in detail below with reference to the enclosed drawings in which FIG. 1 is a block diagram of an apparatus according to the invention, FIG. 2 is a schematical vertical sectional view of the space where the animals are kept, and shows the small capacitor plates arranged in this space.

Figures 3, 4:
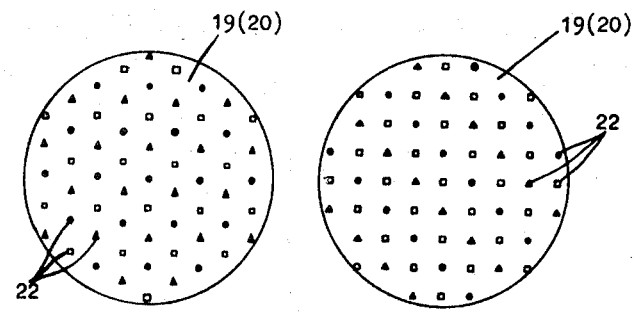
Figure 5:
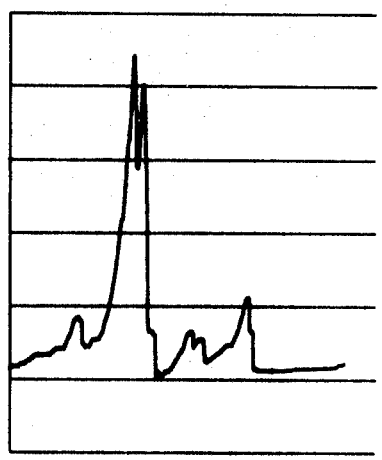

FIGS. 3 and 4 are plain views of the bottom or top of the space, according to FIG. 2 and illustrate two different patterns of the capacitor plates, and FIG. 5 is a curve obtained from the registration of the activity of animals in an apparatus in accordance with FIG. 2.

The apparatus according to the invention consists of a transformer bridge 10, which is designed according to principles known per se, the bridge comprising two branches formed by the windings of the transformer and two branches, each formed by a capacitor 14 and 15 respectively. The bridge is provided with three connections 11, 12 and 13 to which the capacitors 14 and 15 are connected, the connection 12 being connected to the junction of the capacitor branches and to the diagonal of the bridge. The unbalance voltages of the bridge are supplied to a conductor 16, connected to the diagonal of the bridge. If the bridge has been balanced with predetermined values of the capacitors 14 and 15, i.e., the voltage at the conductor 16 is substantially zero and the capacity of one of the capacitors is changed in relation to the other capacitor due to some outer disturbance this will result in an unbalance voltage at the conductor 16. This fact is used in the apparatus according to the invention for measuring the activity of animals by arranging the capacitors 14 and 15 in a space where the animals are kept, this space being marked with a ring 17 (FIG. 1). Before the different electrical parts connected to the transformer bridge 10 will be discussed, the mechanical design of this space will be described in detail.

The space is shown in FIG. 2 and has the shape of an arena. This arena consists of a cylindrical tube 18, e.g., made by transparent polymetacrylate-glass (Plexiglass) and is provided with a bottom 19 and a top 20, which can be slided in the tube and which is made in the same material as the cylinder 18. The bottom as well as the top are axially penetrated by a number of metal threads 21 which end in a head 22 at the upper surface of the bottom and the lower surface of the top respectively. These heads form the above-mentioned small capacitor plates and are connected to each other under the bottom and over the top respectively via connections 23 according to a certain pattern, the heads being arranged in triades, one head in each triade being connected to the connection 12 and thus forming the capacitor plate common to the capacitors 14 and 15, whereas the other two heads in each triade are connected to the connection 11 and the connection 13 respectively and form the other capacitor plate of the capacitors 14 and 15. FIGS. 3 and 4 show two different ways in which the heads could be connected to each other. In these figures the heads which are connected to each other and to the connection 12 are indicated by a square, the heads connected to each other and to the conductor 11 are indicated by a triangle and the heads connected to each other and to the connection 13 are indicated by a circle. It is obvious from the figures that in FIG. 3 the heads are arranged in a triangular system, whereas in FIG. 4 the heads are arranged in a square system. Both systems are equally usable. The distance between the heads is suitably somewhat larger than the length of the animals to be investigated. Due to the fact that the bottom and the top are relatively thick the connection 23 will be situated at a rather large distance from the head 22 which means that the connection does not have to be shielded in order to obtain a capacitive isolation of the head. Such a shielding is, however, within the scope of the invention. The heads 22 are covered by a plastic layer 24 and between the bottom and the top a cylindric cage 25 in which the animals are kept is inserted in the arena. The cage could be made from a net or consist of a foramenous transparent box. It will thus be possible to keep the animals in these cages outside the arena before the investigation is carried out in order that the animals will be accustomed to the environment of the experiment. The disturbance of the animals will also be considerably smaller if they are kept in a cage when they are moved to the arena than if they are picked into the arena when the experiment is to be carried out. In the bottom 19 (or in the top 20) a channel 26 is arranged. Through this channel the cage is connected to the environment, which makes it possible to change the atmosphere or other characteristics in the cage 25. Since the arena and the cage are transparent, it is also possible to change the light conditions and to watch the animals so that the results of the experiment could be compared with the visually registered activity of the animals.

The transformer bridge 10 is connected to an oscillator 27, the frequency of which has such a value that the animals kept in the cage 25 are affected as little as possible by the electric field derived from the capacitors 14 and 15. A suitable frequency is 15 kHz. When the animals kept in the cage 25 move the capacity of the capacitors 14 and 15 is changed because of the variations of the dielectric constant of the capacitors, and if the transformer bridge 10 was balanced when the experiment started, that is the voltage at the conductor 16 was substantially zero, each disturbance of the balance conditions will give rise to signals from the bridge via the conductor 16. This conductor is connected to a preamplifier 29 in which the obtained signals are amplified. The amplified signals are transferred to a phase-sensitive detector 30 which is controlled by the oscillator 27 which is indicated by the conductor 31. The animals in the cage 25 might give rise to smaller or bigger constant unbalances in the bridge, but since it is not the purpose of the apparatus to register these constant unbalance voltages, the signal derived from the phase-sensitive detector 30 is supplied to a differentiating resistor-capacitor network (RC-network) 32 at the output of which only the variations of the voltage obtained from the detector 30 will appear. The time constant of this RC-network should be small in comparison with the shortest possible interval between the changes of the unbalance voltage. When the animals in the cage 25 move, pulses will thus be obtained from the RC-network 32, each pulse being derived from a change of the unbalance conditions and these pulses indicate the activity of the animals. An indicator 33 is connected to the RC-network. The indicator could either be designed to indicate each pulse or to integrate the pulses during a certain period and indicate the sum of pulses during this period. The indicator might also be designed so as to produce a diagram of these sum values. In this case the indicator is provided with a plotter, from which a diagram of the total number of pulses during predetermined intervals is indicated as a function of time. In this way a diagram that indicates the activity of the animals as a function of time is obtained. Such a diagram is shown in FIG. 5. The diagram is obtained from animals which temporarily have been stimulated to a bigger activity which has given rise to a peak in the curve. Since it is possible to watch the animals when the curve is plotted, it is also possible to evaluated the graphically obtained result which could be related to the watched activity. It is also possible by carrying out a series of experiments to show that the registered activity increases proportionally to the number of animals.

The above-described apparatus implies several advantages which have been pointed out above and which makes the apparatus well suited for the investigation of animals of different kinds. The most important advantage consists of course therein, that a reliable and easily interpretable automatic registering can be provided. Another important advantage consists therein that it is possible to introduce animals on the arena without disturbing them and to provide variations of the environment by, e.g., changing the atmosphere, the light intensity, etc. The invention is, however, by no means limited to the embodiment shown above but could be modified within the scope of the enclosed claims in order to suit different purposes of investigation and different animals.

It is suitable to make the capacities of the capacitors 14 and 15 substantially equal when the arena is empty but it is also possible to use only one of these capacitors and to have the other capacitor arranged outside the arena. This capacitor could then be adjustable or have a constant value. From the detector 30 a certain direct voltage level is obtained. This level could represent either the capacitive or the resistive component of the signal obtained from the amplifier 29. The indicating device that is used should have a dissolution that is sufficient compared with the activity of the animals in order to give a detailed result of the activity of the animals. It should also be mentioned that the arena when used for bigger animals, such as rabbits, guinea-pigs or mice might comprise only the bottom 19 or the top 20 and the capacitor heads 22. Thus a net cage in which the animals are kept, might be combined either with the bottom or the top and the design of the arena will then be very simple. The arena shown in the figure has been designed primarily to be used at investigations of small animals such as insects.

We claim:

1. Apparatus for automatic indication of the activity of organisms, especially animals, comprising a space (17) in which the organisms are kept and an indicating device (33) which is affected by the movements of the organisms, the space comprising at least one wall provided with a number of small capacitor plates (22), said plates forming at least one capacitive branch in a transformer bridge, the diagonal of the bridge being connected to a circuit (30,32) sensitive to changes of the balance condition of the bridge, said circuit generating pulses when the balance is affected by activity of said animals and constituting a means for indicating the activity of said animals when the circuit is connected to the indicating device (33).

2. Apparatus according to claim 1, in which the capacitor plates consist of heads (22) arranged at the end of supporting and connection means (21).

3. Apparatus according to claim 2, in which the ends of the supporting and connection means remote to the heads are connected to each other in accordance with a predetermined pattern (FIG. 3 or 4) some of the heads thus forming one plate of the capacitor, whereas the other forms the other plate of the capacitor.

4. Apparatus according to claim 2, in which the heads (22) are arranged on one side of the wall (19, 20) whereas the connections are arranged on the opposite side of the wall.

5. Apparatus according to claim 2, characterized in, that the space (17) comprises two opposite walls (19, 20) provided with said heads (22).

6. Apparatus according to claim 5, characterized in, that one of said walls (20) is slidably movable in relation to the other wall (19).

7. Apparatus according to claim 6, characterized in, that a separate cage (25) is arranged between the walls (19, 20).

8. Apparatus according to claim 1, characterized in, that said circuits (30, 32) comprise a phase-sensitive detector (30) connected to the diagonal of the bridge and a RC-network (32) connected to the output of said detector.

* * * * *